US006963764B2

(12) United States Patent
Jamieson et al.

(10) Patent No.: US 6,963,764 B2
(45) Date of Patent: Nov. 8, 2005

(54) METHOD OF, AND SIGNALLING SYSTEM FOR, TRANSFERRING DATA

(75) Inventors: Philip A. Jamieson, Dorking (GB); Ian A. Marsden, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 560 days.

(21) Appl. No.: 09/944,304

(22) Filed: Aug. 31, 2001

(65) Prior Publication Data

US 2002/0034959 A1 Mar. 21, 2002

(30) Foreign Application Priority Data

Sep. 15, 2000 (GB) .................................... 0022632

(51) Int. Cl.$^7$ ............................. H04B 1/38; H04M 1/00
(52) U.S. Cl. ........................ 455/574; 455/9; 455/343.3; 455/41.2
(58) Field of Search ............................. 455/415, 414.1, 455/9, 11.1, 41.2, 574, 343.3, 343.4, 518, 455/519, 343.1, 343.2, 343.6, 15, 573, 517, 455/3.01, 3.03, 3.04; 370/338, 349, 390; 340/7.45, 7.47, 7.43

(56) References Cited

U.S. PATENT DOCUMENTS

| | | | | |
|---|---|---|---|---|
| 5,790,946 | A * | 8/1998 | Rotzoll ..................... | 455/343.1 |
| 5,862,345 | A * | 1/1999 | Okanoue et al. ............ | 455/433 |
| 6,728,244 | B1 * | 4/2004 | Takabatake ................. | 370/463 |
| 6,732,144 | B1 * | 5/2004 | Kizu et al. .................. | 709/203 |

* cited by examiner

*Primary Examiner*—Nay Maung
*Assistant Examiner*—John J. Lee

(57) ABSTRACT

A method of transferring data signals between a primary station (10) and secondary stations (SL1 to SL5) of a master/slave radio network, comprises the primary station assigning the secondary stations to a plurality of categories (Z1, Z2). The primary station transmits beacon signals containing indications of those categories of the plurality for which it has data to be transferred. A secondary station operating in accordance with a wakeup sequence receives the beacon signals and determines if there is an indication of its category in a received beacon signal. If so, it transmits a request including an indication of its identity. The primary station checks to see if it has a data packet for the identified secondary station and, if it has, it transmits the data packet and, if not, it transmits a negative acknowledgement. Those secondary stations not participating in the exchange of messages can revert to a sleep mode thereby saving power.

18 Claims, 3 Drawing Sheets

METHOD OF, AND SIGNALLING SYSTEM FOR, TRANSFERRING DATA

The present invention relates to a method of, and signalling system for, transferring data between a primary station and secondary stations.

The present invention has particular, but not exclusive, application to low cost master/slave radio networks.

In a master/slave network, a single device (the master or primary station) entirely controls a network of devices (the slaves or secondary stations). In general, the master device will contain a sufficient power source (i.e. mains) whereas the slave devices may be battery-powered. This network paradigm facilitates the use of very simple and hence low cost, slave devices, which can only communicate with the master device.

As the slave devices are battery-powered, they need to be efficient in terms of power consumption. Standard poll/reply methods of transferring messages from the master to a slave device (downlink transfers) have a number of disadvantages.

Poll/reply systems rely on the slave devices being able to receive their polls at regular intervals. This requires the slave devices to listen regularly for a poll from the master. In order to accomplish this the master device must transmit the intended message with some form of wakeup signal to attract the attention of the slave. This wakeup signal must be transmitted for at least as long as the slave is sleeping so that when it wakes up it can detect the wakeup signal and keep its receiver on for the message itself. If no message transfer is necessary (which will happen most of the time), the slave will expend energy needlessly.

Another disadvantage of poll/reply systems is that they suffer from a large duty cycle, which may affect the choice of frequency.

An object of the present invention is to enhance battery economy of slave devices in master/slave networks.

According to a first aspect of the present invention there is provided a method of transferring data between a primary station and a plurality of secondary stations, each secondary station having a distinguishing identifier, comprising assigning the secondary stations to a plurality of categories, storing in the primary station the identifiers of the secondary stations which are in each category, the primary station transmitting beacon signals containing indications of those categories for which it has data to be transferred, a secondary station responsive to determining that there is an indication of its assigned category in a received beacon signal transmitting a response including the secondary station's identifier, and the primary station in response to determining that it has data for transfer to the secondary station having the indicated identifier, transferring the data to the said secondary station.

According to a second aspect of the present invention there is provided a signalling system comprising at least one primary station and a plurality of secondary stations, each of the secondary stations having a distinguishing identifier, the primary station comprising means for storing into which of a plurality of categories the identifiers of the secondary stations have been assigned, and a transmitter for transmitting beacon signals containing indications of those categories for which it has data to be transferred, each secondary station having means for recognising an indication of its category in a received beacon signal and means for transmitting a response including the secondary station's identifier and the primary station having means for determining that it has data for transfer to the secondary station having a recognised identifier and for causing the data to be transmitted to the secondary station.

According to a third aspect of the present invention there is provided a secondary station for use in a signalling system in which a primary station transmits beacon signals containing indications of those categories of secondary stations for which it has data, the secondary station comprising a transceiver, means for storing its allocated category and its own identifier, means for storing a wakeup sequence for the transceiver, means responsive to receiving a beacon signal for checking if the beacon signal contains an indication of its category, and if it has, for causing the transceiver to transmit to the primary station a response message including its identifier, and means responsive to a reply from the primary station for causing the secondary station either to remain energised to receive data or to adopt a sleep mode.

According to a fourth aspect of the present invention there is provided a primary station for use in a data signalling system comprising a plurality of secondary stations, each of the secondary stations having a distinguishing identifier, the primary station comprising means for assigning the secondary stations to a plurality of categories, means for storing the identifiers of the secondary stations in each category, a transmitter for transmitting beacon signals containing indications of those categories for which it has data to be transferred, means for receiving responses including identifiers from secondary stations assigned to the categories indicated in the beacon signals, means for checking if there is data for transmission to the identifier of the secondary station which sent a response and, if so, for causing the data to be transmitted by the transmitter.

A secondary station determining that the beacon signal does not include an indication of its category can adopt a sleep mode in which it wakes up periodically to listen for a beacon signal.

In implementing the method and system in accordance with the present invention the categories may comprise for example operating categories, each category having one or more secondary stations, or wakeup sequences in which certain secondary stations wakeup relatively frequently and others wakeup less frequently.

If desired, the primary station in response to detecting that it does not have data for a particular secondary station may transmit a negative acknowledgement thus enabling the secondary station to power down.

The present invention will now be described, by way of example, with reference to the accompanying drawings wherein.

In the drawings the same reference numerals have been used to illustrate corresponding features.

Figure 1:
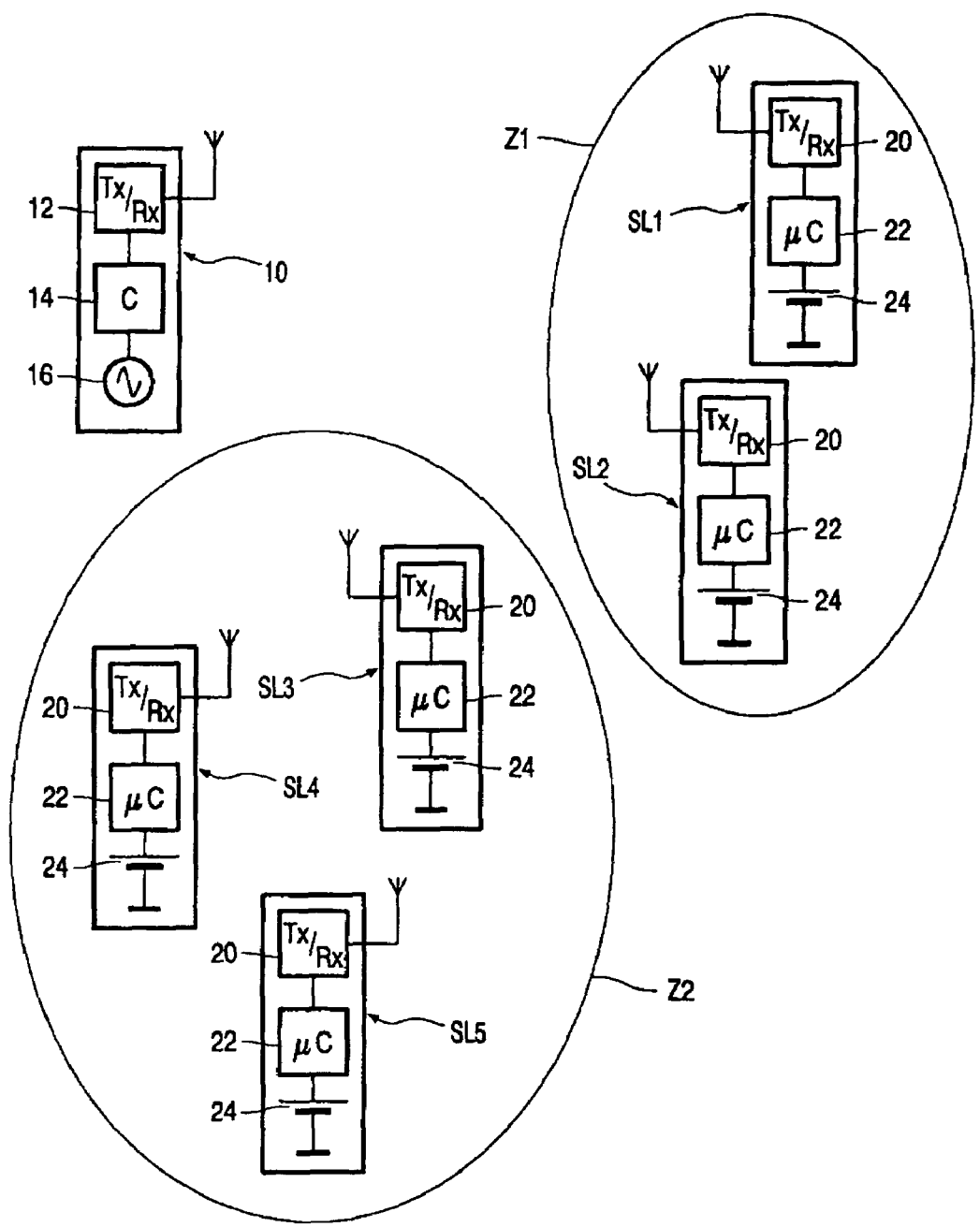
FIG. 1 is a block schematic diagram of a master/slave radio network.

The radio network shown in FIG. 1 comprises a master (or primary) station 10 which includes a transceiver 12 which is controlled by a controller (C) 14. The master station 10 is powered from the mains 16 or other suitable supply such as generators.

The radio network further comprises a plurality of slave (or secondary) stations SL1 to SL5 which for convenience are arranged in two categories Z1, Z2, each of the categories having a common operating characteristic. Each of the slave stations SL1 to SL5 comprises a transceiver 20 which is controlled by a microcontroller 22. The slave stations SL1 to SL5 are powered by respective batteries 24. Each of the slave stations has a respective distinguishing identifier, such as a radio identity code (RIC) or a short form of the RIC.

In the illustrated embodiment the transceivers 12, 20 operate on a single frequency. Transmissions by the slave stations SL1 to SL5 are made in accordance with a multiple access protocol, for example carrier sense multiple access (CSMA) in which a transceiver checks that the frequency channel is free before transmitting. However this does not avoid clashes resulting from a second transceiver checking the frequency channel during the brief interval that a first transceiver is preparing to transmit following checking that the frequency channel is free. A contention resolution scheme, such as a random exponential backoff scheme, may be used to try and avoid the first and second stations from retrying again at the same instant.

In operating the illustrated radio network, the slave stations SL1 to SL5 adopt a sleep mode in which they consume very little power but periodically wakeup to detect beacon signals which are transmitted at regular intervals by the master station 10. A slave station has a wakeup sequence which may be different from other slave stations in its category, for example one or more may wake-up every 30 ms and another or others may wakeup every 2 s. In order for a slave station to determine whether the master station 10 has a data message, the network defines a number of categories ($Z_{max}$) into which slave stations can be assigned. Not all the categories may have slave stations assigned to them because the network is dynamic thereby enabling slave stations not only to join or leave the network but also to be reassigned from one category to another. The regularly transmitted beacon signals serve to synchronize the slave stations and include indications of which categories currently have pending messages for one or more of the slave stations located within a particular category.

Figure 2:
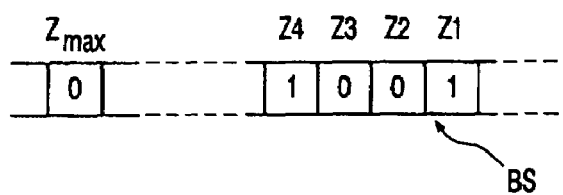
FIG. 2 is a diagram representing part of a beacon signal.

FIG. 2 illustrates an example of the relevant part of a beacon signal BS in which a number, $Z_{max}$, of bits are reserved for indicating respectively which of the categories the master station 10 has data messages for. Referring to FIG. 2, bit positions Z1 to $Z_{max}$ correspond to the respective categories and if the master station 10 has one or more data messages for slave stations in any particular category, the corresponding bit value is "1" but otherwise it is "0". Thus as illustrated the master station has messages for slave stations in categories Z1 and Z4 only. Slave stations in the categories Z2, Z3 and Z5 to Zmax on determining that there are no data messages for their categories, revert to a sleep mode. However the slave stations in the categories Z1 and Z4 on waking-up determine that the relevant bit positions of a received beacon signal have a value 1. Each of these slave stations transmits a data request signal which includes its radio identity code to the master station as a CSMA signal and activates its receiver. The master station receives the data request, checks if it has a data message for the particular radio identity code and, if it has, it transmits a data packet to that slave station. The slave station acknowledges the message to complete the transaction. If the master station does not have a data message for a particular slave station, it transmits a negative acknowledgement to that slave station and on receipt the slave station can revert to a sleep mode.

If the master station has no more messages pending in that category, it resets the corresponding pending bit from "1" to "0".

Figure 3:
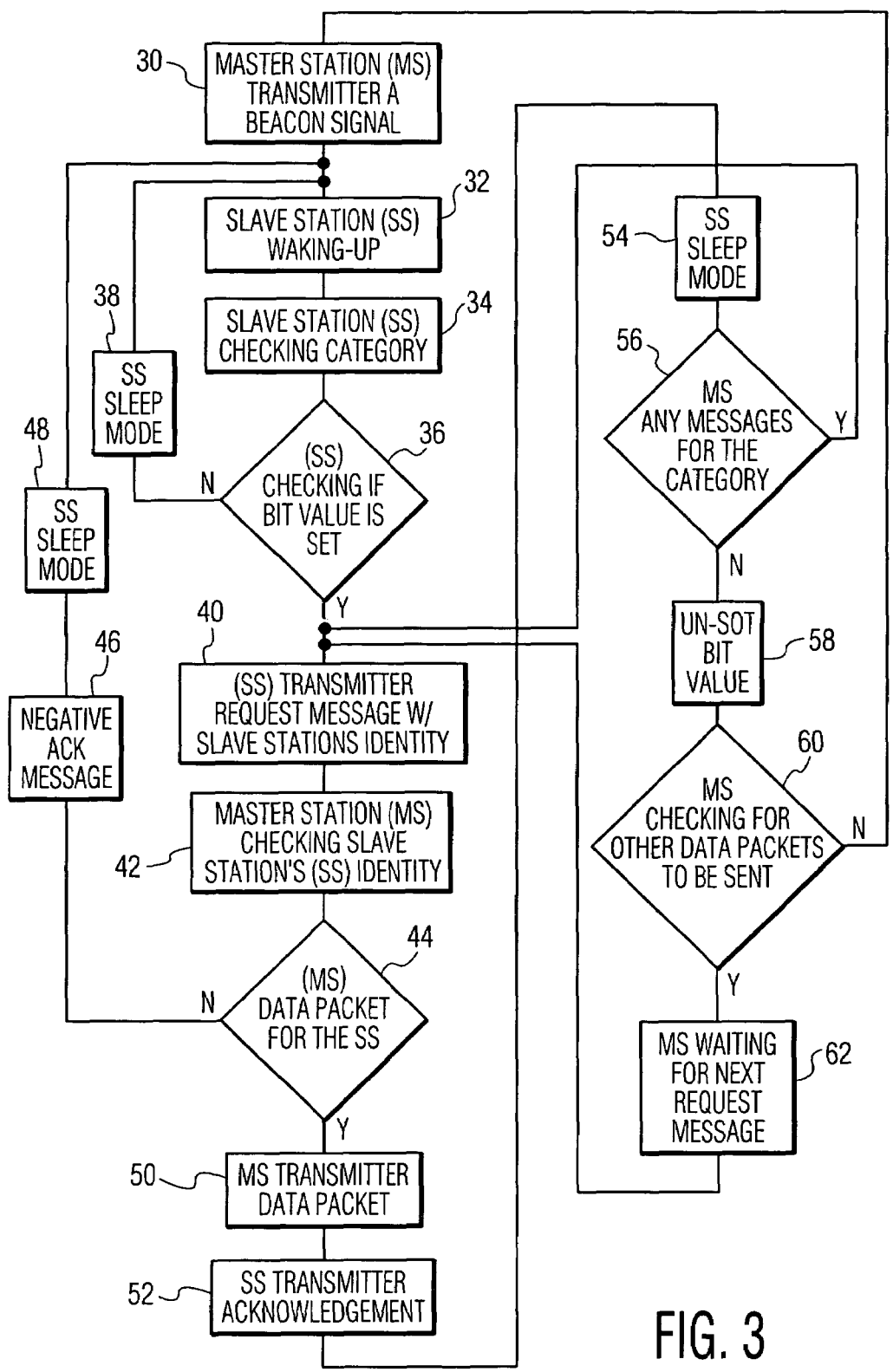
FIG. 3 is a flow chart illustrating the basic operation of the master/slave radio network.

FIG. 3 is a flow chart which summarises the basic method in accordance with the present invention. Block 30 denotes the master station 10 transmitting a beacon signal. Block 32 denotes the slave station waking-up. Block 34 denotes the slave station checking the bit value corresponding to its category. Block 36 denotes checking if the bit value is "1". If it is not (N), the slave station reverts to a sleep mode as indicated by the block 38. If it is "1" (Y), block 40 denotes the slave station transmitting a request message which includes the slave station's identity. Block 42 denotes the master station checking the slave station's identity against the identities appended to the data packets. Block 44 denotes checking if the master station has a data packet for the particular slave station. If it has not (N), block 46 denotes the master station transmitting a negative acknowledgement message and block 48 denotes the slave station reverting to a sleep mode. If there is a data packet for the slave station (Y), the block 50 denotes the master station transmitting the data packet. Block 52 denotes the slave station transmitting an acknowledgement. Block 54 denotes the slave station reverting to a sleep mode. Block 56 denotes the master station checking if it has any messages left for the category from which the preceding message was destined for. If there is none (N) then the block 58 denotes changing the bit to "0". If there are still some messages left (Y) the flow chart reverts to the block 40 where the master station waits for the next request and identification from a slave station.

From the block 58, the flow-chart proceeds to block 60 which denotes the master station checking if there are any other data packets to be forwarded to a slave station. If the answer is No (N), the flow chart reverts to the block 30. If the answer is Yes (Y), block 62 denotes the master station waiting for the next request message.

When slave stations with long and short wakeup intervals are assigned to the same category there will be cases where a slave station requests data to be transferred and no data for that station is pending, and consequently the master station 10 sends a negative acknowledgement. For example, two slave stations may be assigned to a category where one wakes up every 2 s and the other wakes up every 30 ms. If the master station wishes to send a message to the former device, the latter device may repeatedly request data. Consequently, an adaptive solution is required which will allow a slave device to dynamically change its category assignment.

When a slave station joins a master/slave radio network it is assigned a unique address, by which it can operate on the network, and assumes an assignment to category Z (=1). If during its operation, the slave station requests data in this category but receives a negative acknowledgement for more than some threshold (e.g. 5 times within a prescribed time period) then it elects to switch to another category, for example the next category, $((Z \mod Z_{max})+1)$.

To do this the slave station must first transmit a category change notification to the master station with an indication of the category to which it intends to switch. If the slave station receives a successful acknowledgement to this message it can switch to its new category. If not, if must remain where it is, or attempt to inform the master station of its intentions again. This communication to the master is essential for the master to keep synchronized with the slave device.

Figure 4:
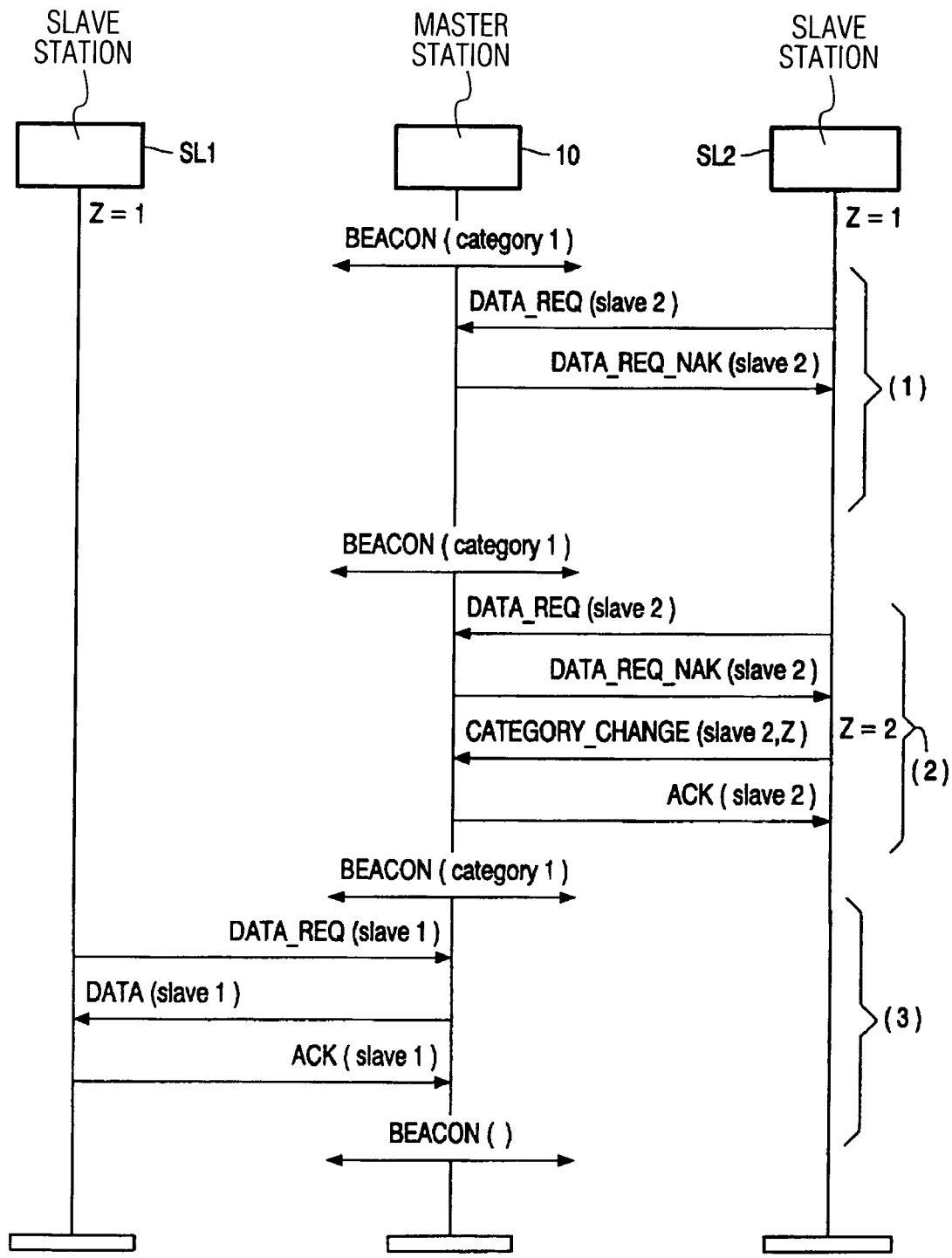
FIG. 4 is a diagram illustrating dynamically adjusting the allocated category.

This operation is illustrated in FIG. 4. In this example there are two slave stations SL1, SL2 and a master station 10. Slave station SL1 sleeps for long periods of time but slave station S2 wakes up more frequently. Both slave stations assume the default category Z1. The master station 10 wishes to transmit a message to slave 1. Referring to FIG. 4, for convenience three stages (1), (2) and (3) are shown.

Stage 1. The master station 10 indicates that it has a message for slave station SL1 in category Z1 by setting the first bit of its categories pending flags field of its network beacon (BEACON (category 1) packet) to 1. Slave station SL2 wakes up, listens to the beacon signal and detects that a message is pending in category Z1. It then transmits a data request (DATA_REQ (slave 2) packet) to the master station. Since the master station does not have a pending message for slave station SL2, it responds with a data request, negative acknowledgement (DATA_REQ_NAK (slave 2) packet). Slave station SL2 notes this and increments a message request failure count.

Stage 2. The master station transmits the next beacon signal BS (BEACON (category 1)) and, since slave station SL1 has not yet requested the pending message the master still has the first bit set in its categories pending flags field of the network beacon signal. Slave station SL2 again wakes up, listens to the beacon signal, and detects that a message is pending in category Z1. It then transmits another data request (DATA_REQUEST (slave 2)) to the master station and receives another negative acknowledgement (DATA_REQ_NAK (slave 2)). This time, its message request failure count has reached some threshold and the slave station SL2 decides to switch to category Z2. It consequently transmits a change of category notification (CATEGORY_CHANGE (slave 2, z) packet) to the master station with the number of the category to which it intends to switch. The master station then acknowledges (ACK (slave 2) packet) the category change notification and updates its device table for slave station SL2.

Stage 3. The master device transmits the next beacon signal and, since slave station SL1 has not yet requested the pending message, the master still has its first bit set to 1 in its categories pending flags field of the network beacon signal. This time slave station SL1 wakes up, listens to the beacon, and detects that a message is pending in category Z1. It then requests the data (DATA_REQ (slave 1)) and the master station transmits the data to the slave station SL1 (DATA (slave 1) packet). When slave station SL1 transmits an acknowledgement (ACK (slave 1)) to the master station, the latter resets the first bit of its message pending flags field "0". (Note that slave station SL2 may also have listened to this network beacon but did not detect any messages pending in category Z2.) Consequently the next signal beacon contains no set categories pending flags.

Performing this operation eventually serves to group slave devices with similar wakeup sequences together into a common category. This contributes to decreasing the power consumption and duty cycles of slave devices on the network.

The method and the signalling system in accordance with the present invention may be dual frequency with the master station making downlink transmissions on a first frequency channel and the slave stations making uplink transmissions on a second frequency channel.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of master/slave systems and component parts therefor and which may be used instead of or in addition to features already described herein.

What is claimed is:

1. A method of transferring data between a primary station and a plurality of secondary stations, each secondary station having a distinguishing identifier, the method comprising the steps of:
    assigning each secondary station to at least one of a plurality of categories, wherein each station in a category has at least one common characteristic;
    storing, in the primary station, the identifiers of the secondary stations which are in each category;
    transmitting, by the primary station, beacon signals containing indications of those categories for which the primary station has data to be transferred;
    determining, by each of the secondary stations whether there is an indication of the secondary station's assigned category in a received beacon signal;
    transmitting, by each of the secondary stations in the category a response including the secondary station's identifier;
    determining whether the primary station has data for transfer to the secondary station having the indicated identifier.

2. The method as claimed in claim 1, wherein the beacon signals are transmitted intermittently.

3. The method as claimed in claim 1, wherein the primary station acknowledges negatively if the primary station does not have a data signal for a secondary station in an indicated category.

4. The method as claimed in claim 1, wherein a secondary station intermittently monitoring for the presence of beacon signals.

5. The method as claimed in claim 1, wherein a secondary signalling a request for a change of category to the primary station.

6. The method as claimed in claim 5, wherein a change of category request signal includes an indication of the category to be changed to.

7. The method as claimed in claim 1, wherein each of the categories comprise a common operating characteristic.

8. The method as claimed in claim 7, wherein the common operating characteristic a secondary station wakeup sequence.

9. The method as claimed in claim 1, further including the step of transferring the data to the said secondary station.

10. A signalling system comprising at least one primary station and a plurality of secondary stations, each of the secondary stations having a distinguishing identifier, the primary station comprising means for storing into which of a plurality of categories the identifiers of the secondary stations have been assigned, wherein each station in a category has at least one common characteristic, and a transmitter for transmitting beacon signals containing indications of those categories for which the primary station has data to be transferred, each secondary station having means for recognising an indication of the category it has been assigned in a received beacon signal and means for transmitting a response including the secondary station's identifier when the category the secondary station has been assigned is indicated in the received beacon signal and the primary station having means for determining that the primary station has data for transfer to the secondary station having a recognised identifier and for causing the data to be transmitted to the secondary station.

11. The system as claimed in claim 10, wherein the primary station has means for causing the transmitter to transmit the beacon signals intermittently.

12. The system as claimed in claim 10, wherein the primary and secondary stations operate on a single frequency channel.

13. The system as claimed in claim 10, wherein the primary station has means for transmitting a negative acknowledgement if the primary station does not have a data signal for a secondary station in an indicated category.

14. The system as claimed in claim 10, wherein a secondary station having means for intermittently monitoring for the presence of beacon signals.

15. The system as claimed in claim 10, wherein a secondary signalling having means for transmitting a request for a change of category to the primary station.

16. The system as claimed in claim 15, wherein said means for transmitting a request for a change of category includes means for indicating the category to be changed to.

17. A secondary station for use in a signalling system in which a primary station transmits beacon signals containing indications of those categories of secondary stations for which the primary station has data, wherein each station in a category has at least one common characteristic, the secondary station comprising a transceiver, means for storing an allocated category and secondary station identifier, means for storing a wakeup sequence for the transceiver, means responsive to receiving a beacon signal for checking if the beacon signal contains an indication of the allocated category, and if the indication of the allocated category is determined, the secondary station causing the transceiver to transmit to the primary station a response message including the secondary station identifier, and means responsive to a reply from the primary station for causing the secondary station either to remain energized to receive data or to adopt a sleep mode.

18. A primary station for use in a data signalling system comprising a plurality of secondary stations, each of the secondary stations having a distinguishing identifier, the primary station comprising means for assigning the secondary stations to a plurality of categories, wherein each station in a category has at least one common characteristic, means for storing the identifiers of the secondary stations in each category, a transmitter for transmitting beacon signals containing indications of those categories for which the primary station has data to be transferred, means for receiving responses including identifiers from secondary stations assigned to the categories indicated in the beacon signals, means for checking if there is data for transmission to the identifier of the secondary station which sent a response and, if so, for causing the data to be transmitted by the transmitter.

* * * * *